United States Patent Office 3,450,600
Patented June 17, 1969

3,450,600
MALTING APPARATUS IN SERIES
James Richard Allan Pollack, Cabinteely, and Alan Aldred Pool, Foxrock, Ireland, and Graham John Ellis, Newbridge, Wales, assignors to Arthur Guinness Sons & Company (Dublin) Limited, and The Irish Mallsters Association, both of Dublin, Ireland, and both companies of Ireland, and Rimer Manufacturing Company Limited, Cardiff, Wales, a British company
Filed Aug. 30, 1966, Ser. No. 576,147
Claims priority, application Great Britain, Sept. 8, 1965, 38,348/65
Int. Cl. C12b 1/00; C12c 1/04
U.S. Cl. 195—129                                2 Claims

ABSTRACT OF THE DISCLOSURE

Apparatus for malting steeped cereal grain comprising two vessels one of which is a malting vessel and the other a storage vessel. The internal surface of the malting vessel converges downwardly toward the outlet. Sweeper means within the malting vessel is gyrationally mounted adjacent the outlet, grain engaging means provided on the sweeper, and the sweeper is adapted to sweep over substantially the whole area of the convergent surface for loosening the grain to be discharged. Means associated with the malting vessel for adjusting temperature, humidity, and rate of air flow therein to condition the cereal grain. First transfer means for conveying grain discharged from the malting vessel to the storage vessel. Second transfer means associated with the storage vessel for returning to the inlet means of the malting vessel grain discharged from the storage vessel.

---

This invention relates to the malting of cereal grain and is particularly directed towards an improved process and apparatus therefor.

In the conversion of cereal grain, for example barley, wheat, oats and the like, into malt a basic process is adopted by which the cereal grain is steeped in water and then allowed to germinate during which time it is aerated with humidified, attemperated air and becomes malted. During the malting period, which lasts approximately from five to eight days the developing cereal grain has to be loosened and turned over frequently so as to prevent matting together of the growing rootlets and to facilitate dissipation of heat evolved during malting. The evolution of heat during malting is accompanied by the liberation of carbon dioxide, accumulation of which must also be avoided if malting is not to be impaired by asphyxiation of the cereal grain.

Several processes have hitherto been proposed for the malting of cereal grain. In the conventional process cereal grain is steeped with water in tanks and the steeped grain removed therefrom and spread over a floor area on which it is allowed to germinate. From time to time the grain is manually turned or agitated for the purpose of cooling and aerating it and to prevent entanglement of growing rootlets. It will be apparent that this process requires a considerable amount of floor area over which the steeped grain must be spread and in view of the labour involved for turning becomes relatively expensive. Furthermore, it is not possible to subject the growing grain to steeping with hot water to kill the rootlets and so arrest their growth at the required stage, a treatment which is advantageous because it reduces malting loss and accelerates malting.

Consequently an unnecessary amount of growth takes place in the conventional process and malting requires a period of approximately seven days from the start of germination instead of four days required when the hot water treatment is used. During such time a malting loss of approximately 8% by weight of the cereal grain results due to growth and the emission of carbon dioxide.

In a further proposed process cereal grain is deposited in box-like apparatus in which is located a plough-like machine. The steeped cereal grain is deposited in the box-like apparatus and when germination commences and the rootlets start to grow the germinating grain is periodically turned and agitated by the plough-like machines. The design of the box-like apparatus does not permit the germinating grain to be subjected to hot water to kill the rootlets and thereby arrest growth of the cereal grain at the required stage. Furthermore, the plough-like machines are only efficient for turning and agitating the grain within the box-like apparatus for a depth of cereal grain of approximately four feet so that if this depth is exceeded inadequate cooling of the grain results.

In a still further proposed process steeped cereal grain is deposited in drums in which the necessary turning or agitation of the cereal grain is effected by rotation of the drum instead of by mechanism within the vessel. Whilst such drums are relatively efficient in preventing rootlet entanglement the necessity of circulating air at controlled humidity and temperature throughout the drum involves mechanical difficulties and further, if the drum is to be suitable for allowing the grain to be treated with hot water to arrest growth when required, the structure of the drum has to be considerably strengthened, all of which adds considerably to both capital and operating costs.

In a still further previously proposed process cereal grain is deposited on a continuously, very slowly moving conveyor, is steeped and allowed to germinate thereon whilst continuously moving on the conveyor. The capital cost and running cost of this continuous system are relatively high in comparison with the aforementioned processes.

It is an object of the present invention to provide a process for the malting of cereal grain which process can be utilised either for the progressive malting of cereal grain or for the malting of cereal grain utilising the batch principle.

It is a further object of the present invention to provide apparatus for use in the malting of cereal grain which apparatus is relatively inexpensive to manufacture and requires relatively low running costs.

According to the present invention there is provided a process for the malting of cereal grain which includes the steps of providing, in a malting zone within a vessel, the internal surface of which the malting zone converging downwardly towards an outlet, a bulk quantity of steeped grain; adjusting the temperature, humidity and rate of flow of air within the zone to facilitate malting; allowing partial malting to take place in the malting zone; continuously discharging the so loosened partially malted grain immediately on loosening; and transferring the discharged partially malted grain into a further zone constituted by a separate vessel; whereby the entangled rootlets of the partially malted grain become disentangled prior to its continued processing.

Further according to the present invention there is provided apparatus for use in the malting of cereal grain which includes two vessels each of which has inlet means and outlet means, one of which vessels is a malting vessel provided with an internal surface which converges downwardly towards the outlet means and has associated therewith means for adjusting temperature, humidity and rate of flow of air within the malting vessel to condition cereal grain therein for malting, means within the vessel for progressively loosening grain for immediate discharge of so loosened grain through the outlet means, and transfer means for conveying so discharged grain to the second vessel.

Still further according to the present invention there is provided a malting vessel having inlet means and outlet means and an internal surface which converges downwardly towards the outlet means, and which vessel includes means for adjusting temperature, humidity and rate of flow of air therein, and means for progressively loosening grain therein for immediate discharge through the outlet means comprising a sweeper arm adapted to rotate axially within the vessel and incorporating means adapted to contact and loosen grain during rotation thereof, the sweeper arm extending upwardly within the vessel from a position adjacent the outlet means and being mounted to be capable of gyrational movement within the vessel.

The malting vessel can be provided with a water inlet and an outlet so that fresh cereal grain can be steeped in water within the malting vessel prior to the grain being allowed to be partially malted therein. Althernatively, the malting vessel can be charged with previously steeped cereal grain.

Once germination of the cereal grain has commenced in the malting vessel and the rootlets start to grow, the carbon dioxide liberated can be effectively removed by air fans or the like and the growth of the rootlets can be effectively controlled by adjustment of the temperature and humidity of the atmosphere within the malting vessel. To prevent the growing rootlets from becoming too entangled, the outlet of the malting vessel is periodically opened and the entangled partially malted cereal grain progressively loosened from the vicinity of the outlet from which the so loosened partially malted grain is continuously discharged on loosening and transferred to the second vessel.

The second vessel can be in the form of either a storage vessel having an inlet and an outlet, or a further malting vessel having an inlet and an outlet the internal surface of which converges downwardly towards the outlet. The further malting vessel can incorporate means for adjusting temperature, humidity and rate of flow of air therein to condition the partially malted grain transferred thereto for further malting and means for progressively loosening the partially or fully malted grain prior to immediately discharging the so loosened partially or fully malted grain through its outlet.

In one form of the process according to the present invention utilising a malting vessel and a storage vessel, a batch process is employed in which the entire bulk of partially malted grain is discharged from the malting vessel and transferred to the storage vessel and when the malting vessel has been completely emptied, the entire bulk of the partially malted and disentangled grain in the storage vessel is discharged and transferred therefrom back into the empty malting vessel for continued malting. In this way it is ensured that the partially malted cereal grain is disentangled throughout its entire bulk. It will be apparent that by passing the grain into and out of the storage vessel it can be disentangled when required and the whole process of malting within the malting vessel can be adequately controlled. When malting is completed the batch of malted grain in the malting vessel can be transferred for kilning.

In a further form of the process according to the present invention a cyclic batch process is utilised in which two malting vessels and one storage vessel are employed. By this process both malting vessels are charged with cereal grain and the cereal grain is partially malted in both these vessels. The entire bulk of partially malted grain is discharged and transferred to the storage vessel from one malting vessel after which the partially matled grain from the second malting vessel is discharged and transferred into the empty first malting vessel. Finally, the partially malted grain in the storage vessel is discharged and transferred therefrom into the empty second malting vessel. In this way the partially malted grain in each malting vessel has been removed therefrom once and consequently disentangled prior to its continued malting.

It will be appreciated that the above mentioned cyclic batch process can be employed for more than two malting vessels but still one storage vessel. By charging all the malting vessels and partially malting the grain in all these vessels, then discharging and transferring to the storage vessel the entire bulk of partially malted grain from the first of the malting vessels, discharging and transferring into the first empty malting vessel the entire bulk of partially malted grain from another malting vessel, discharging and transferring in sequence to the matling vessel which has last been emptied, the entire bulk of partially malted grains from one of the other malting vessels until the contents of each malting vessel have been removed at least once and finally discharging and transferring into the last of the malting vessels to be emptied the contents of the storage zone, the entire batch of partially malted grain is re-located in the malting vessels for continued malting.

Alternatively, the process according to the present invention can be progressive in which case a plurality of malting vessels is utilised. Bulk cereal grain is deposited in the first malting vessel and can be steeped therein if required. When the steeped grain in the first malting vessel has been partially malted, it is discharged and transferred therefrom to a further malting vessel thereby causing the rootlets of the grain to become disentangled. Such discharge and transfer of the cereal grain from malting vessel to malting vessel continues through each vessel until the final vessel discharges malted cereal grain. It will be apparent that as the cereal grain is discharged and transferred from the first vessel to the second vessel, a fresh bulk supply of cereal grain can be supplied to the first malting vessel emptied, thereby providing a progressive malting process.

In the progressive process as above described it is possible that the partially malted grain in any one of the malting vessels will require further disentangling other than that received during their progressive progress from malting vessel to malting vessel. If this is necessary a storage vessel is provided and the contents of the malting vessel in question can be discharged and transferred therefrom to the storage vessel and re-cycled back to the same malting vessel thereby disentangling the rootlets of the cereal grain without disturbing the sequence of progressive flow through the system.

Each of the malting vessels can conveniently be of upright cylindrical form one end of which is conical, the inside surface converging downwardly towards an outlet provided adjacent the apex of the cone. Provided within the cone is a perforated partition member spaced from the inner surface of the cone to provide a space therebetween within the cone into which air can be passed for circulation; the perforated partition member serving to distribute air evenly throughout grain deposited in the vessel. Extending upwardly through the malting vessel is a sweeper arm provided with radial tines. The lower end of the sweeper arm is connected through a universal coupling to a drive shaft capable of being rotated by an electric motor or otherwise to impart rotational movement to the sweeper arm. The sweeper arm can alter its attitude in relation to the drive shaft and thereby pass substantially throughout the volume of the conical portion of the malt vessel. With the outlet closed, cereal grain is deposited in the malting vessel and lies around the sweeper arm. After partial malting of the cereal grain and when it is required for the rootlets thereof to be disentangled, the outlet is opened and rotation of the sweeper arm effected through the drive shaft. The tines on the sweeper arm engage with the bulk of the partially malted grain and so loosens the grain with which they become engaged. The so loosened partially malted grain is discharged by gravity from the malting vessel immediately on loosening. As more partially malted grain is loosened and discharged, the rotating sweeper arm commences to gyrate or exhibit random movement and thereby through contact with grain progressively loosens the partially malted grain which is discharged from the malting vessel. As the bulk of partially malted grain in the lower conical part of the malting vessel is reduced, the partially malted grain from the upper part of the malting vessel drops and is loosened and discharged.

Alternatively, the means for loosening the partially malted grain prior to its discharge through the outlet can be provided by a rotating worm carrying tines for engaging with the partially malted grain in the malting vessel, the worm exhibiting rotational movement but not necessarily exhibiting gyration.

It will be appreciated that the final discharge of grain from the malting vessel is accomplished by aid of the above described loosening and disentangling means.

The or each malting vessel may be of substantially upright cylindrical form and the converging internal surface provided by the perforated partition member.

The transfer means for conveying the discharged partially malted grain from one malting vessel to a further malting vessel or to a storage vessel and vice versa can conventiently be provided by conveyor belts, elevators, Archimedean screws and the like or alternatively chutes along which the loosened partially malted grain can pass under gravity or under fluid pressure.

It will be apparent that the apparatus according to the present invention is suitable for use with the "conventional" process whereby steeped cereal grain is allowed to germinate on the batch process or the progressive process without killing the growing rootlets to arrest growth. Alternatively, by equipping the malting vessels with suitably located hot water inlets and outlets the grain can be subjected to hot water to kill the rootlets and thereby arrest growth when required. Further, the apparatus of the present invention allows malting of the cereal grain to take place in deep beds thereby utilising considerably less floor area for a given quantity of cereal grain than was hitherto possible in previously proposed apparatus. The floor area utilised for a given quantity of cereal grain is inversely related to the depth of the beds of cereal grain possible by each process. As an example, in the process whereby the cereal grain is spread over a floor the depth of bed is normally of the order of 8 inches; in the process utilising the box-like apparatus the bed of grain is usually 3 to 4 feet in depth; in the process utilising the rotating drum an equivalent depth of bed is not more than 5 feet and in the continuous process the depth of bed is approximately 3 feet; whereas by the apparatus and process of the present invention the depth of bed possible is considerably greater than hitherto, for example, 13 feet.

Several embodiments of the present invention will now be described, by way of example only, and with reference to the accompanying diagrammatic drawings, in which.

Figure 1:
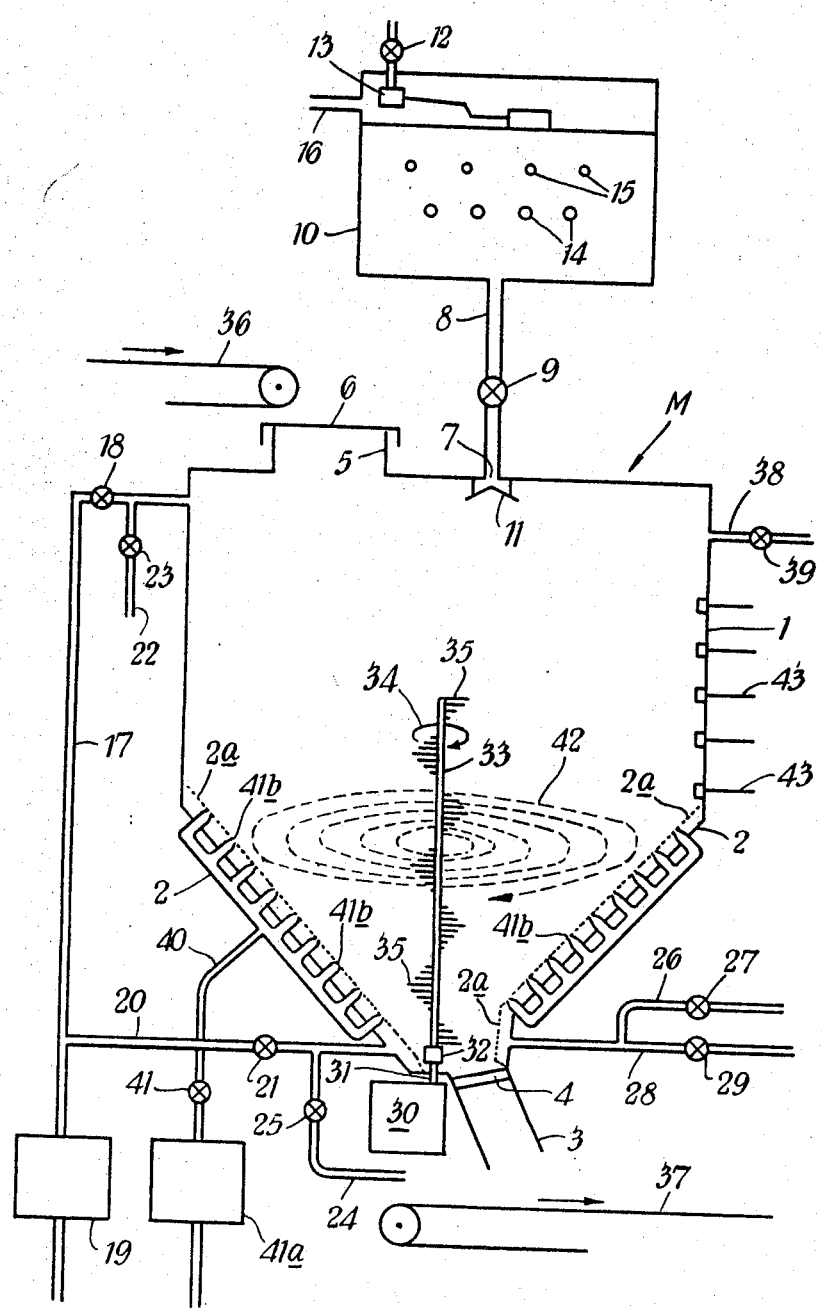
FIG. 1 is a diagrammatic representation of a malting vessel and associated services for use in the process according to the present invention.

Referring first to FIG. 1 in the drawings, a stationary malting vessel shown generally at M comprises a substantially cylindrical upper portion 1 and a conical lower portion 2 the internal surface of which converges downwardly towards an outlet 3 located substantially on or adjacent to the apex of the conical portion 2. Provided within the conical portion 2 is a perforated partition member 2a of general conical shape spaced uniformly from the inner surface of the conical portion 2, the perforations being sufficiently small to inhibit the passage of grain therethrough. The outlet 3 is closeable by a trap 4. The top of the cylindrical portion 1 is closed and provided with a grain inlet 5 closeable by a trap 6. The top of the cylindrical portion 1 is further provided with an inlet 7 which communicates through a conduit 8 and valve 9 with a water reservoir 10 whereby water can be passed into the malting vessel M. The inlet 7 is provided with a spreader device 11. The water reservoir 10 is connected to a water supply main through a flow control valve 12 and a float operated switch 13 and is equipped with heaters 14, thermostats 15 and an overflow conduit 16.

The cylindrical portion 1 is connected at its upper part through a conduit 17 and a valve 18 to an air conditioning unit 19. The space formed between the conical portion 2 and the perforated partition member 2a is similarly connected through a conduit 20 and a valve 21 to the air conditioning unit 19. Located in the conduit 17 between the valve 18 and the cylindrical portion of the malting vessel M is branch conduit 22 which communicates through a closure valve 23 to atmosphere. Similarly provided in the conduit 20 between the valve 21 and the malting vessel M is a branch conduit 24 which communicates through a closure valve 25 to atmosphere. The air conditioning unit 19 includes a fan and humidifying, cooling and heating means. By suitable control of the valves 18, 21, 23 and 25 conditioned air from the unit 19 can be directed to either the top or bottom of the malting vessel so that the direction of flow of the conditioned air through the malting vessel may be reversed as required.

The lower part of the conical portion 2 is connected through a conduit 26 and closure valve 27 for the inlet of mains water. A water outlet conduit 28 controlled by closure valve 29 communicates with the lower part of the conical portion 2. A further water outlet conduit 38 controlled by closure valve 39 communicates with the upper part of the cylindrical portion 1.

A conduit 40 incorporating a control valve 41 is provided through which air under pressure can be passed from an air compressor 41a to a series of air injection nozzles 41b located in the partition member 2a.

Located below the bottom of the malting vessel M is an electric motor 30 adapted to rotate a shaft 31. Connected to the shaft 31 through a universal coupling 32 is a sweeper arm 33 which exhibits axial rotation as shown by arrow 34 when the shaft 31 is driven. The sweeper arm 33 extends upwardly from the bottom of the malting vessel M throughout the length of the conical portion 2 and carries a plurality of radially extending helically arranged tines 35. By providing the universal coupling 32 between the sweeper arm 33 and the shaft 31, it will be apparent that the sweeper arm 33 can pivot about the shaft 31 and thereby move, whilst rotating, through the majority of volume of the portion of the malting vessel enclosed by the conical portion 2.

Located above the grain inlet 5 is a conveyor shown generally at 36 by which cereal grain can be introduced into the malting vessel M when the trap 6 is removed. Located beneath the outlet 3 is a belt conveyor shown generally at 37 by which the contents of the malting vessel M as discharged therefrom through the outlet 3 can be transferred as required.

The malting vessel M is provided with thermometers 43 for recording the temperatures at varying heights within the vessel.

An example of the use of the malting vessel and auxiliary apparatus as above described and illustrated in initiating malting of barley will now be considered.

Water from the mains supply is allowed to enter the reservoir 10 through valve 12 with valve 9 closed. When the required volume of water has been admitted to the reservoir 10 the float operated switch 13 is actuated to close the valve 12. The heaters 14 are now operated to raise the temperture of the water in the reservoir to a desired value controlled by the thermostats 15.

With trap 4 closed and trap 6 open, fresh barley from the conveyor 36 is deposited into the malting vessel M until the required volume of barley is deposited therein after which the trap 6 is closed. With valves 12, 18, 21, 23, 25, 27, 29, 39 and 41 closed, the valve 9 is opened to admit the water from the reservoir 10 into the malting vessel until the whole of the barley therein is immersed for steeping. Valve 9 is now closed and valve 12 opened to allow the reservoir 10 to refill. The spreading device 11 ensures that the force of the water from the reservoir 10 is broken on entering the malting vessel to avoid undue disturbance of the barley.

The barley is now allowed to steep in the water and if required air from the compressor can periodically be blown upwardly through the mixture of grain and water by opening valve 41 thereby causing the mixture to be vigorously agitated to ensure that the surface area of the barley corns is thoroughly cleansed by the water. Any scum and dirt separated from the barley collects on the surface of the water in the malting vessel and can conveniently be removed by opening valves 39 and 27 and allowing mains water to enter the malting vessel through conduit 26 causing the water therein and consequently any dirt and scum to overflow through the conduit 38. Agitation of the mixture of barley and water by periodic blasts of air from the compressor 41a through conduit 40 provides convenient means to prevent packing of the barley arising from absorption of water and consequent swelling of the barley corns during steeping.

When the first steep is complete, the water is drained from the malting vessel through conduit 28 by opening valve 29 (valve 27 being closed at this time). When the malting vessel has drained, the valve 29 is closed and humid air at a desired temperature is now passed from the air conditioning unit 19 through the barley in the malting vessel. By suitable control of valves 18, 21, 23 and 25 the air can pass either upwardly or downwardly through the barley. With valves 21 and 23 open and valves 18 and 25 closed, the air will flow upwardly through the barley and alternatively with valves 18 and 25 open and valves 23 and 21 closed the air passes downwardly through the barley. The flow of air through the barley is periodically reversed to even out inequalities of temperature and moisture within the bed of barley in the malting vessel which inequalities may otherwise occur if the air flow is confined to one direction.

Whilst the barley is being subjected to flow of humid air, the reservoir 10 is being filled with water and heated as above described in readiness for a second steep of the barley which is carried out in a similar manner to that as above described. During the second steep, compressed air can again be periodically passed upwardly through the mixture of barley and water to reduce the tendency of the barley to pack through absorption of water and consequent swelling.

When the second steep is completed, the water is drained from the malting vessel and the barley again subjected to humid air and aerated to promote malting.

At this stage germination has commenced and the growing rootlets of the barley corns tend to become entangled and matted. If such entanglement were permitted to continue for the whole malting period, considerable difficulty would be incurred both in removing the grain from the malting vessel and in controlling aeration during malting. To obviate such difficulty it becomes necessary to loosen periodically the entangled rootlets of the barley corns prior to continuing malting and such loosening preferably takes place at a known stage in the growth of the rootlets.

When the rootlets of the partially malted barley have reached such a stage in their growth and are consequently becoming increasingly entangled, valves 18 and 21 are closed and trap 4 opened. The sweeper arm 33 is now axially rotated as shown by arrow 34 by the motor 30 and during such rotation the tines 35 engage with the partially malted barley and so loosen the barley in the vicinity of the tines from the remaining entangled bulk of the barley. The partially malted barley so loosened falls under gravity to the bottom of the conical portion 2 and is discharged through the outlet 3 onto the belt conveyor 37. As the volume in the malting vessel, from which partially malted barley has been removed, increases, the tines 35 progressively work through the remaining mass of entangled barley and so cause the sweeper arm 37 to exhibit gyrational movement as indicated by the dotted line 42 about the shaft 31 through the universal coupling 32. Such gyrational movement continues until the whole of the partially malted barley in the malting vessel has been progressively loosened and discharged through the outlet 3.

It will be appreciated that as the partially malted barley in the lower portion of the malting vessel is progressively loosened and discharged, the overlying partially malted barley drops downwardly through the malting vessel to a position such that it comes into contact with the tines of the sweeper arm 33. The sweeper arm 33 is normally located in an inclined position prior to its operation and during its rotation the sweeper arm 33 normally moves first to an upright position and then exhibits gyrational movement about the longitudinal axis of the malting vessel. Suitable loosening of the entangled partially malted barley is however achieved for any starting position of the sweeper arm 33.

The disentangled partially malted barley continuously discharged through the outlet 3 is transferred on the conveyor belt 37 to a separate vessel prior to its continued malting.

To illustrate the application of the invention to the complete malting process the stages involved in the malting of cereals, especially barley, will now be considered.

As a first example, the following times and temperatures may be employed in the various stages of malting:

(a) Steeping the barley in water for six hours at 18° C.;

(b) Aerating with humid air for 22 hours at 18° C.;

(c) Steeping in water for 30 minutes at 18° C.;

(d) Aerating with humid air for 24 hours at 18° C.;

(e) Steeping with water for 30 minutes at 18° C.;

(f) Aerating with humid air at 18° C. for approximately 4, 4½ or 5 days;

(g) Kilning using air at a temperature of approximately 88° C. for 24 hours.

In the above process, in view of the entanglement of the growing rootlets it is preferable that the partially malted grain is loosened and disentangled between stages (d) and (e) and periodically during stage (f) say every 6 hours.

In a modified process to that above described stages (a) to (d) are the same. However, after stage (d) the partially malted barley is steeped in water at a temperature of approximately 40° C. for one hour after which it is aerated with humid air for approximately 43 hours at 18° C. The malted barley is then submitted to kilning as described in stage (g) above.

By steeping the partially malted grain in water at 40° C. growth of the rootlets of the barley is retarded and consequently a saving in malting loss is achieved. In the latter modified process it may be unnecessary to loosen the grain during aeration but the loosening and disentangling means is used to assist discharge of the grain at the end of the process.

Several modified processes for the malting of cereal grain by the process according to the present invention and utilising a malting vessel or vessels illustrated in, and above described with reference to FIG. 1 will now be considered by way of example only.

For convenience, where possible throughout the following description, like parts or members in each of the figures have been accorded like reference numerals and each of the malting vessels has been accorded the reference M and each of the storage vessels accorded the reference S.

Figure 2:
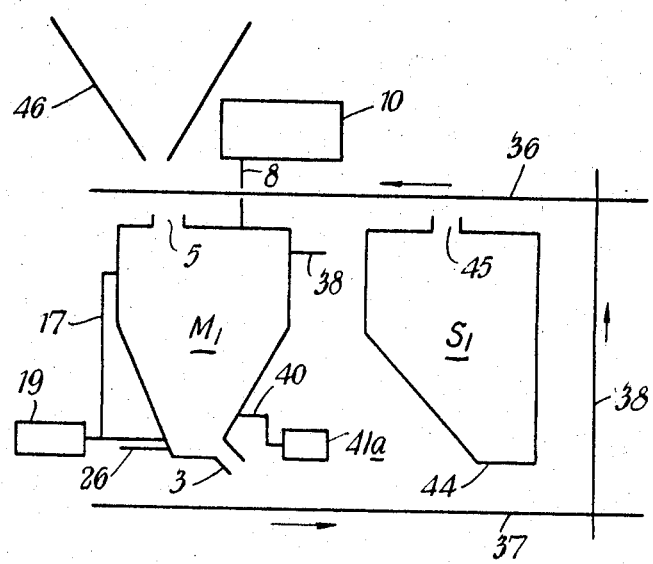
FIG. 2 is a diagrammatic representation of an arrangement utilising a single malting vessel and a single storage vessel suitable for use in a batch process of the present invention.

Referring to FIG. 2, there is provided a malting vessel M1 and a stationary substantially upright storage vessel S1. The storage vessel S1 can conveniently be of cylindrical form the internal surface of the lower portion of which converges downwardly towards a closeable outlet 44. The storage vessel is provided with an inlet 45. Situated beneath the outlets 3 and 44 of the vessels M1 and S1 respectively is the belt conveyor 37 which discharges onto an elevator 38 which in turn discharges onto the upper conveyor 36. A supply hopper 46 is located to deposit fresh barley onto the conveyor 36 and associated with the conveyor 36 are controllable guide means (not shown) whereby grain on the conveyor can be introduced into either inlet 5 or 45 of the vessels M1 and S1 respectively.

In operation, fresh barley from the hopper 46 is transferred by way of the conveyor 36 and inlet 5 into the malting vessel M1 in which it is steeped and aerated to promote malting as above described with reference to FIG. 1. When it becomes necessary to loosen the entangled partially malted barley, the outlet 3 is opened and the continuously discharged loosened partialy malted barley is transferred by way of conveyor 37, elevator 38, conveyor 36 and inlet 45 into the storage vessel S1. When the entire bulk of the partially malted barley in the malting vessel M1 has been loosened and transferred into the storage vessel S1, the outlet 44 is opened and the loosened partially malted barley is re-transferred by way of conveyor 37, elevator 38, conveyor 36 and inlet 5 back into the malting vessel M1 wherein malting of the barley continues. It will be apparent that by using this batch process the entire bulk of the partially malted barley can be loosened and turned as required at any convenient time during germination.

Figure 3:
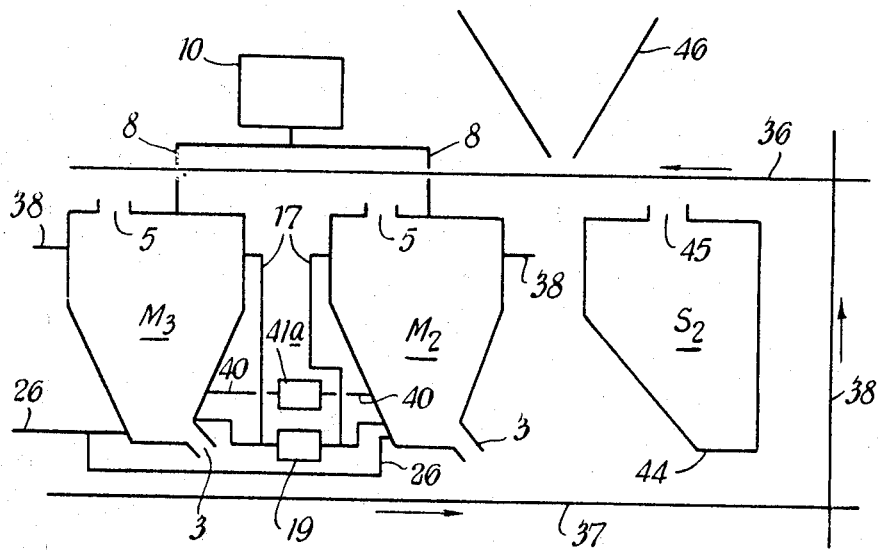
FIG. 3 is a diagrammatic representation of an arrangement utilising two malting vessels and a single storage vessel for use in a cyclic batch process according to the present invention.

In FIG. 3 two malting vessels M2 and M3 are utilised in combination with a storage vessel S2. The malting vessels M2 and M3 are provided with a common water reservoir 10, a common air conditioning unit 19 and a common air compressor 41a.

In operation, fresh barley from the hopper 46 is transferred on the conveyor 36 into the malting vessel M2 and a day later a further quantity of fresh barley is introduced into the vessel M3. When the malting vessel M2 is charged steeping can commence in it, and similarly for malting vessel M3. Consequently the barley in the malting vessel M2 will be at a stage of malting one day ahead of the barley in the malting vessel M3. When it is required to loosen the entangled rootlets of the partially malted barley in each of the vessels M2 and M3, the partially malted barley in vessel M2 is discharged therefrom and transferred by conveyor 37, elevator 38 and conveyor 36 into the storage vessel S2. When the vessel M2 is completely empty, the entire bulk of the partially malted barley in the vessel M3 is discharged therefrom and transferred by conveyor 37, elevator 38 and conveyor 36 into vessel M2. When the vessel M3 is empty, the entire content of the storage vessel S2 is transferred by the conveyors and elevator into the vessel M3. It will be apparent that a cyclic batch process is provided in which the partially malted barley in each of the malting vessels M2 and M3 can be loosened at any convenient stage during malting.

Figure 4:
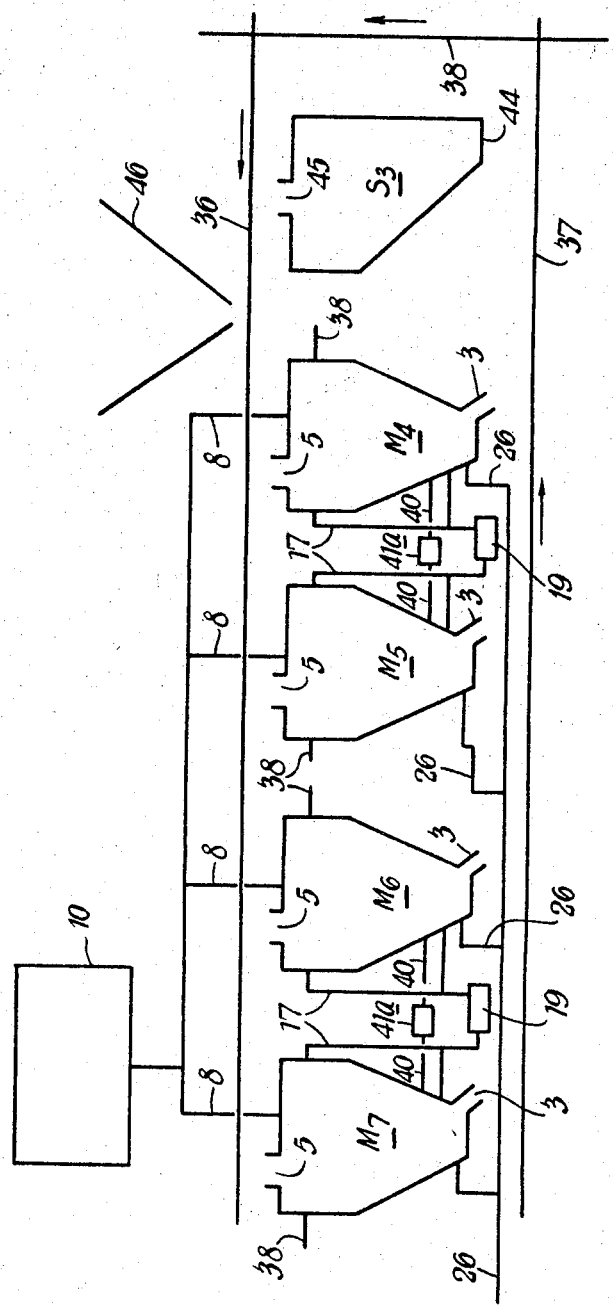
FIG. 4 is a diagrammatic representation of an arrangement utilising four malting vessels and a single storage vessel for use in a modified cyclic batch process according to the present invention.

Referring now to FIG. 4, four malting vessels M4 to M7 are provided in combination with a storage vessel S3. The four malting vessels are provided with a common water reservoir 10 and the malting vessels M4 and M5 are provided with a common air conditioning unit 19 and a common air compressor 41a as are the vessels M6 and M7.

In operation, fresh barley from the supply hopper 46 is transferred on conveyor 36 which, in this embodiment, may be an archimedean screw and introduced simultaneously into the vessels M4 to M7. As each malting vessel is charged with its required content of barley the steeping operation commences for the barley in that vessel. When it becomes advisable during the process of malting to disentangle the rootlets of the partially malted barley the entire bulk of the content of vessel M4 is discharged therefrom and transferred into the storage vessel S3. When vessel M4 is completely empty the entire content of vessel M5 is discharged therefrom and transferred into vessel M4. When vessel M5 is completely empty the entire content of vessel M6 is discharged therefrom and transferred into vessel M5. When vessel M6 is completely empty the entire content of vessel M7 is discharged therefrom and transferred into vessel M6. Finally, when the vessel M7 is completely empty the entire content of the storage vessel S3 is discharged therefrom and transferred into the vessel M7. It will be apparent that the partially malted barley in each of the malting vessels M4 to M7 is removed at least once and thereby loosened and turned.

From the operation of the process above described with reference to FIGS. 3 and 4 it will be observed that by taking the time taken to charge each malting vessel with the required content of barley equal to the time taken to completely empty each of the malting vessels, a constant phase relationship can be maintained between the various stages in the malting process for each of the batches of the barley in the malting vessels.

A progressive process for the malting of barley will now be considered wich utilises a plurality of germintion vessels. In the embodiment illustrated in FIG. 5 four malting vessels M8 to M11 are provided with a common water reservoir 10 and each pair of germination vessels M8 and M9 and M10 and M11 are provided with a common air conditioning unit 19 and a common air compressor 41a. In combination with the four malting vessels is a storage vessel S4. In a similar manner to the embodiments illustrated in FIGS. 2 to 4 there is provided a lower conveyor 37 feeding onto an elevator 38 which in turn feeds an upper conveyor 36. The barley supply hopper 46 is located above vessel M8 adapted to deposit barley therein. The upper conveyor 36 is further provided with guide means (not shown) whereby partially malted barley on the conveyor can be directed into any one of the germination vessels M9 to M11 or the storage vessel as required.

Figure 5:
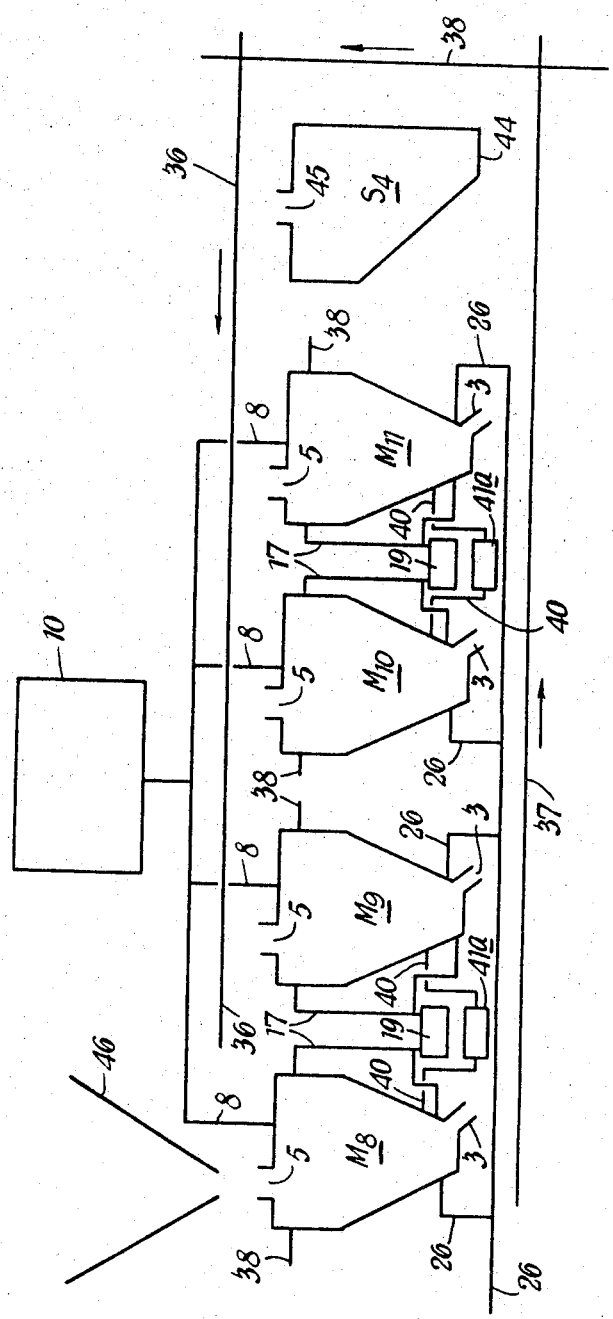
FIG. 5 is a diagrammatic representation of an arrangement utilising four malting vessels and a single storage vessel for use in a progressive malting process according to the present invention.

In operation of the apparatus illustrated in FIG. 5, to provide a progressive process for the malting of barley, the conditions employed therein being described by way of example, fresh barley from hopper 46 is introduced into the malting vessel M8 in which it is stepped for six hours. The barley is then aerated for eighteen hours and then discharged from vessel M8 and transferred along conveyor 37, elevator 38 and conveyor 36 into vessel M9 within which it is aerated for four hours and then steeped for one hour. The water is drained off and the aeration at once recommenced and continued until twenty four hours have elapsed since the commencement of discharge from vessel M8. The grain is then discharged from vessel M9 and transferred along conveyor 37, elevator 38 and conveyor 36 into vessel M10 in which it is further aerated for five hours and then steeped in water at 40° C. for one hour. The water is drained off and the aeration at once recommenced and continued until twenty four hours have elapsed since the commencement of discharge from vessel M9. The grain is then discharged from vessel M10 and transferred along conveyor 37, elevator 38 and conveyor 36 into vessel M11 in which it is aerated until twenty four hours have elapsed since the commencement of discharge from vessel M10. The grain is then discharged from vessel M11 and transferred for kilning.

When the grain has been discharged from vessel M8 this vessel is again charged with fresh barley and the sequence of operation repeated. In a similar manner, upon discharge of the first charge of grain from vessel M9 the second charge in vessel M8 is discharged and transferred to vessel M9 and, at the completion of this discharge, vessel M8 is again charged with fresh barley. The progressive system so established may be continued indefinitely.

It will readily be understood that since partially malted barley may, in the progressive system above described, be transferred from one malting vessel to a further vessel only once every twenty four hours, the storage vessel S4 is employed if it is necessary to loosen and disentangle the grain more frequently than this. Should partially malted barley in any one of the malting vessels require loosening and disentangling during the period it resides in a particular vessel, then it can be discharged from that vessel and transferred on the conveyor 37, elevator 38 and conveyor 36 into the storage vessel S4 and then re-transferred on the conveyors and elevator from the storage vessel back into the particular malting vessel from which it came without disrupting the progressive sequence of flow through the vessels.

On the progressive system considered with reference to FIG. 5 several processes can be employed, it being realised that as the first malting vessel M8 becomes empty it is recharged with barley, for example:

1(a) Vessel M8—steep for six hours and then aerate for 24 hours;

(b) Vessel M9—steep 1 hour, aerate 25 hours, steep ½ hour and aerate 3½ hours;

(c) Vessels M10 and M11—aerate in each vessel for 30 hours;

(d) For the partially malted barley in vessels M9 to M11—periodically discharging and transferring through the storage vessel S4 and then back into the same vessel to loosen and disentangle the barley when required.

2(a) Vessel M8—steep for 30 hours;

(b) Vessel M9—steep for 10 hours and then aerate for 20 hours;

(c) In each of vessels M10 and M11—aerate with conditioned air for 30 hours;

(d) Discharge and transfer the barley in each of vessels M9 to M11 through the storage vessel S4 as required for loosening and disentangling.

It will be apparent that several modifications are possible to the progressive processes as above described, for example the number of malting vessels can be increased or decreased which will naturally alter the periods to which the barley in each vessel is subjected to conditions peculiar to that vessel. Any malting vessels which are utilised only for the purpose of steeping the barley can be replaced by steeping tanks which do not incorporate means for aerating the grain. More than one storage vessel can be utilised if required.

If required the barley can be further conditioned to promote germination during transfer from one vessel to another, for example by the application of moisture thereto. This has particular advantages when the nature of the barley to be used, or the desired cereal grain to be used, indicates that spray-steeping would be appropriate or when it is desired to provide steeps of short durations, such as in the case of multiple steeping processes. A section or sections of the conveyors and/or elevator may be provided with sprays or otherwise arranged so that the barley is immersed in water during its transference. In these cases provision may be made for recovery and re-use of the water not absorbed by the grain so that effluent is minimised. In a similar manner by use of suitable valves and conduits water employed for the second and subsequent steeps can be recovered for re-use.

As above discussed, the malting of barley or other cereal grain in hitherto proposed processes and apparatus in beds deeper than approximately four feet has been unsuccessful because of uneven drying and the means for loosening and disentangling the partially malted grain. However, by the apparatus of the present invention depths of grain in the order of 13 feet can be handled.

In each of the processes according to the present invention the timing and operation of the various stages involved to effect germination may be fully or partially automated.

We claim:

1. Apparatus for use in malting cereal grain which comprises
    two vessels one of which is a malting vessel and the other of which is a storage vessel;
    inlet means and outlet means in each of said two vessels;
    said malting vessel being provided with an internal surface which converges downwardly towards said outlet means;
    means associated with said malting vessel for adjusting temperature, humidity and rate of flow of air within said malting vessel to condition cereal grain therein for malting;
    sweeper means within said malting vessel adapted to sweep over substantially the whole area of the convergent surface of said malting vessel for progressively loosening grain in contact with said convergent surface for immediate discharge of so-loosened grain through said outlet means
    said sweeper means comprising (a) a sweeper arm extending upwardly within the vessel from a position adjacent said outlet means and being gyrationally mounted and adapted to rotate axially within said vessel, and (b) grain engaging means provided on said sweeper arm to contact and loosen grain during rotation thereof;
    first transfer means for conveying grain discharged from the malting vessel to the storage vessel; and
    second transfer means associated with said storage vessel for returning to the inlet means of said malting vessel grain discharged from said storage vessel.

2. Apparatus as claimed in claim 1 wherein the storage vessel has an internal surface which converges downwardly towards its outlet means, and wherein there is included means associated with said storage vessel for discharging grain through its outlet means.

References Cited

UNITED STATES PATENTS

| 456,872 | 7/1891 | Wiesebrock | 195—128 |
| 500,509 | 6/1893 | Prinz | 195—141 |
| 758,083 | 4/1904 | Lapp | 195—129 |
| 2,545,542 | 3/1951 | Bodcher et al. | 195—70 |
| 2,998,351 | 8/1961 | Stoddart et al. | 195—71 |

FOREIGN PATENTS 2,782  12/1898  Great Britain.

LIONEL M. SHAPIRO, *Primary Examiner.*

NORMAN ROSKIN, *Assistant Examiner.*

U.S. Cl. X.R.

195—70